US010822559B2

(12) United States Patent
Drees et al.

(10) Patent No.: US 10,822,559 B2
(45) Date of Patent: Nov. 3, 2020

(54) METHODS OF APPLYING MULTI-BONDED SAMPS TO EQUIPMENT AND PRODUCTS AND APPARATUS COMPRISING SAM SURFACES

(71) Applicant: ELECTROLAB, INC., Boerne, TX (US)

(72) Inventors: Sean Eric Drees, Boerne, TX (US); Todd Mathias, Spring, TX (US); Ajeeta Patil, San Antonio, TX (US); Christopher Gallagher, Spring, TX (US)

( * ) Notice: Subject to any disclaimer, the term of this patent is extended or adjusted under 35 U.S.C. 154(b) by 74 days.

(21) Appl. No.: 15/332,949

(22) Filed: Oct. 24, 2016

(65) Prior Publication Data

US 2018/0142170 A1    May 24, 2018

Related U.S. Application Data

(63) Continuation of application No. 14/099,497, filed on Dec. 6, 2013, now Pat. No. 9,476,754.

(Continued)

(51) Int. Cl.
| | |
|---|---|
| C10G 75/04 | (2006.01) |
| C09D 7/63 | (2018.01) |
| G01F 23/64 | (2006.01) |
| C10G 75/00 | (2006.01) |
| C10G 75/02 | (2006.01) |
| F16L 58/04 | (2006.01) |
| C09D 5/16 | (2006.01) |
| C09D 5/00 | (2006.01) |
| C09D 7/61 | (2018.01) |

(Continued)

(52) U.S. Cl.
CPC .......... *C10G 75/04* (2013.01); *B65D 25/14* (2013.01); *C09D 5/00* (2013.01); *C09D 5/1625* (2013.01); *C09D 7/40* (2018.01); *C09D 7/61* (2018.01); *C09D 7/63* (2018.01); *C10G 75/00* (2013.01); *C10G 75/02* (2013.01); *F16L 58/02* (2013.01); *F16L 58/04* (2013.01); *G01F 23/64* (2013.01); *G01F 23/76* (2013.01); *B82Y 15/00* (2013.01); *C10G 2300/4075* (2013.01); *G01F 23/683* (2013.01); *Y10T 29/49885* (2015.01); *Y10T 29/52* (2015.01)

(58) Field of Classification Search
CPC ....... C10G 75/00; C09D 7/1233; G01F 23/64; Y10T 29/52; Y10T 29/49885; B82Y 15/00
USPC .......................................................... 73/305
See application file for complete search history.

(56) References Cited

U.S. PATENT DOCUMENTS 4,972,709 A * 11/1990 Bailey, Jr. ............ E21B 17/1035
                                                              200/308
5,862,702 A *  1/1999 Liang ...................... G01F 23/64
                                                              200/84 C (Continued)

*Primary Examiner* — Nathaniel T Woodward
(74) *Attorney, Agent, or Firm* — Gilbreath & Associates, P.C.; J. M. (Mark) Gilbreath

(57) ABSTRACT

A method for treating surfaces of equipment comprising applying a Self Assembled Monolayer of a moiety to at least one surface of the equipment, wherein the equipment is selected from the group consisting of level sensors, sucker rods, turbine meters, Coriolis meters, magnetic flow meters, down hole pumps, check valves, valves, cables, drill bits, wire lines, and pigs, and the moiety may be present in di or tri headed form or as a bis, gem-bis or tris headed form, and is a phosphonate, and equipment having at least one surface comprising such a treated surface.

23 Claims, 6 Drawing Sheets

Related U.S. Application Data

(60) Provisional application No. 61/770,963, filed on Feb. 28, 2013.

(51) Int. Cl.
*G01F 23/76* (2006.01)
*B65D 25/14* (2006.01)
*F16L 58/02* (2006.01)
*C09D 7/40* (2018.01)
*B82Y 15/00* (2011.01)
*G01F 23/68* (2006.01)

(56) References Cited

U.S. PATENT DOCUMENTS

| | | | |
|---|---|---|---|
| 6,185,994 B1 * | 2/2001 | Liang | G01F 23/72 73/114.56 |
| 6,983,655 B2 * | 1/2006 | Liang | G01F 23/72 73/313 |
| 2006/0017281 A1 * | 1/2006 | McKeen | F16L 9/121 285/45 |
| 2011/0252884 A1 * | 10/2011 | Hanscombe | G01L 9/0008 73/32 A |
| 2014/0134426 A1 * | 5/2014 | Henry | B05D 5/00 428/327 |

\* cited by examiner

METHODS OF APPLYING MULTI-BONDED SAMPS TO EQUIPMENT AND PRODUCTS AND APPARATUS COMPRISING SAM SURFACES

CROSS-REFERENCE TO RELATED APPLICATION DATA

This utility application is a continuation of U.S. patent application Ser. No. 14/099,497, filed Dec. 6, 2013, which claims priority to U.S. Provisional Patent Application Ser. No. 61/770,963 filed Feb. 28, 2013, both of which are incorporated herein by reference for all purposes, it is also a continuation of U.S. patent application Ser. Nos. 15/164,842, 15/164,846, 15/164,849, 15/164,851, 15/164,855, 15/164,859, 15/164,862, 15/164,865, and 15/164,867, all of which were filed May 25, 2016, all of which are continuations of U.S. patent application Ser. No. 14/099,497, filed Dec. 6, 2013, which claims priority to U.S. Provisional Patent Application Ser. No. 61/770,963 filed Feb. 28, 2013, with all being incorporated by reference for all purposes.

BACKGROUND OF THE INVENTION

1. Field of the Invention

The present invention related to methods, apparatus and products relating to hydrocarbon liquids, crude oil, paraffin and asphaltene. In another aspect, the present invention relates to methods, apparatus and products for operating in hydrocarbon liquid, crude oil or other environments, especially environments in which paraffin and/or asphaltene may be present, whether solubilized, in solid form, and/or in the process of precipitating. In even another aspect, the present invention relates to paraffin and asphaltene deposition on components used in crude oil service operations. In still another aspect, the present invention relates to coatings for reduction of paraffin and asphaltene deposition on various surfaces in crude oil service. In yet another aspect, the present invention relates to coatings to address paraffin/asphaltene deposition on various surfaces. In even still another aspect, the present invention relates to unique application of coatings for the reduction of paraffin and asphaltene deposition on various equipment, including, but not limited to sucker rods, turbine meters, Coriolis meters, magnetic flow meters, down hole pumps, check valves, valves, cables, drill bits, wire lines, safety valves, floating head storage tank, and pigs, just to name a few. In even yet another aspect, the present invention relates to a method and kit for surface treatment of cooperating, controller or sensor components used in crude oil service operations to reduce paraffin/asphaltene deposition. Non-limiting examples of suitable coatings include SAM coatings, including but not limited to thiol SAM coatings, and silane SAM coatings.

2. Description of the Related Art

Deposition of the high-molecular-weight components of petroleum fluids as solid precipitates in surface facilities, pipelines, downhole tubulars, and within the reservoir are well-recognized production problems. Depending on the reservoir fluid and the type of recovery process, the deposited solid may consist of asphaltenes and/or waxes. Certainly, these deposits may also contain resins, crude oil, fines, scales, and water.

The components of the heavy fraction of a petroleum fluid can be separated into four groups: saturates, aromatics, resins, and asphaltenes (SARA). Saturates include all hydrocarbon components with saturated (single-bonded) carbon atoms. These are the n-alkanes, i-alkanes, and cycloalkanes (naphthenes). Aromatics include benzene and all the derivatives composed of one or more benzene rings. Resins are components with a highly polar end group and long alkane tails. The polar end group is composed of aromatic and naphthenic rings and often contains heteroatoms such as oxygen, sulfur, and nitrogen. Pure resins are heavy liquids or sticky solids. Asphaltenes are large highly polar components made up of condensed aromatic and naphthenic rings, which also contain heteroatoms. Pure asphaltenes are black, non-volatile powders.

Petroleum waxes are complex mixtures of n-alkanes, i-alkanes, and cycloalkanes with carbon numbers of ranging approximately from 16 to 40, 50, 60, 65 or even higher. The minimum energy-chain structure of alkanes is a flat zig-zag of carbon atoms with the hydrogen atoms located in planes passing through the carbon atoms perpendicular to the chain axes.

There are two general classes of petroleum waxes. Waxes composed primarily of cycloalkanes and i-alkanes crystallize as small needle structures and are referred to as microcrystalline waxes. Waxes composed primarily of normal alkanes crystallize in large flat plates (macrocrystalline structures) and are referred to as paraffin waxes.

Paraffins, more commonly referred to as alkanes, are the chemical family of saturated hydrocarbons that result from combining $CH_2$ groups in succession. Additional $CH_2$ groups are added to form straight-chain paraffins.

As used herein, the term "wax" may simply refer to saturated hydrocarbons that contain more than 16 carbon atoms in the paraffin series and up to 40, 60, 80, 100 or even more carbon atoms and are in a solid state at room temperature. The majority of waxes present in crude oil are considered synthetic paraffin waxes with non-oxidized saturated alkanes. Many of these are complex mixtures that may become solid by precipitation.

Paraffins may exist in crude oil in all three states. At standard room temperature, $C_{16}$+n-paraffins generally exists in a solid form and solidify to form deposits. Wax is the product of paraffin deposition, so in the industrial context, "wax" and "paraffin" are often used interchangeably.

Therefore, "paraffin wax deposition" refers to the solid form of paraffins that solidify to cause deposition. These deposits will incorporate the crude oil matrix. The deposit will be a framework that may be as low as a few percent wax for a young deposit to close to all wax for an old deposit in a high flow area.

Because asphaltene is typically talked about in the same context as paraffin, it is important to understand what asphaltene is and why it is problematic to the crude oil service operations. Asphaltene is the material present in petroleum that is insoluble in n-paraffins but soluble in aromatic solvents. Asphaltenes cause catalyst deactivation and sediment formation.

Asphaltenes are a solubility class that is soluble in light aromatics such as benzene and toluene but is insoluble in lighter paraffins. They normally are classified by the particular paraffin used to precipitate them from crude (e.g., n-pentane or n-heptane). Although the exact nature of the original state of equilibrium of asphaltenes in petroleum fluids is still under investigation, one characteristic is the tendency of asphaltenes to form aggregates in hydrocarbon solutions. These aggregates are called micelles. The micelles and the hydrocarbon medium form a colloidal system. One commonly held view is that the colloids are stabilized by resins adsorbed on their surface, and the dispersion of colloids in the fluid form a two-phase system. Colloids also may be solvated by the surrounding medium, forming a true single-phase solution. Thermodynamic models inherently assume the single-phase view. The role of resins in the single-phase or two-phase solution models may be quite different. Changes in pressure, temperature, and composition may alter the solubility parameter of the oil and/or the asphaltene-resin association and cause asphaltene precipitation.

Tars or asphaltenes occur in many crudes as colloidally suspended solid particles. Precipitation takes place when the crude loses its ability to keep those particles dispersed. Many of the same factors affecting paraffin deposition (discussed below) also affect asphaltene deposition.

Paraffins precipitate out of waxy crudes when there is a slight change in equilibrium conditions, causing a loss of solubility of the wax in the crude. A lowering in temperature is the most common cause of paraffin precipitation.

Thus, hydrocarbon liquids, including both crude oils and condensates, form a paraffin or asphaltene solid phase when process temperatures fall below the cloud point (or Wax Appearance Temperature) of the liquid. While this normally occurs in colder temperature services, it may also occur in any process where the combination of complex composition factors, such as API gravity, pressure/temperature variables and other factors favor deposition.

The presence of asphaltenes increases the difficulties for paraffin wax treatments because these structures are almost always found in association with waxes when they are retrieved from wells, storage tanks, or pipelines (Becker J. R. 1997, Crude oil waxes, emulsions, and asphaltenes. Tulsa, Okla.; PennWell Publishing Company). While paraffin wax deposition may be reduced by increasing the flow velocity of crude, increasing fluid velocities increases the likelihood of asphaltene deposition.

Further, studies show that the amount of asphaltene precipitation decreases as the number of carbons forming straight-chain paraffins increases. In other words, treatment of paraffin wax could escalate the precipitation of heavier, problematic asphaltene compounds. Therefore, treatment of paraffin and asphaltene deposition must both be considered in the balance.

Once formed, these paraffin/asphaltene solids will typically deposit on tank-mounted level sensors and instrumentation. This deposition presents a potential safety hazard when critical operational and/or safety sensors are affected. This may cause a loss of billions of dollars per year worldwide through the enormous cost of remediation, reduced or deferred production, well shut-ins, equipment replacements and/or abandonments, equipment failures, extra horsepower requirements, and increased manpower needs.

The modern petroleum industry has developed new technologies for controlling the deposition of petroleum paraffin and asphaltenes, particularly in wells, storage tanks, and pipelines. However, these technologies have been less effective on sensitive tank level sensors, flow sensors, and other instrumentation. Traditional methods of management and remediation have been established for many years and include the following:

a. Chemical Treatments and Additives: While chemical treatments help to manage solids deposition in connected lines, instrument tubing and storage tank internal components, some chemicals do not suspend the paraffin indefinitely and may be damaging to the environment.

b. Hot Oiling: Hot oiling is one method often employed for removing deposition in storage tanks. Paraffin and asphaltene buildup is handled by periodically pumping very hot oil, augmented by cleansing additives, into the vessels in order to melt the accumulations from tank walls, sensors and internal equipment.

c. Manual Cleaning: During normal maintenance operations, internally mounted equipment may be periodically subject to manual cleaning. This typically involves removal of sensors, instruments, etc. from out-of-service tanks and process equipment for cleaning. Alternately, personnel may physically enter out-of-service tanks to perform the cleaning with sensors and equipment in place. These methods typically involve considerable expense in time and labor for taking equipment out of service, the cleaning process itself, and management of safety associated with hazardous conditions, including hydrogen sulfide ($H_2S$) exposure.

However, these procedures are labor and cost intensive and are not very effective with sensitive sensors and instrumentations. The solution is to avoid wax and asphaltene depositions in the first place.

There are a number of published patent applications and patents directed to monolayers, the following of which are merely a few.

U.S. Pat. No. 6,146,767 issued Nov. 14, 2000, to Schwartz, discloses self-assembled organic ligand monolayers on the surface of a metal oxide or silicon oxide substrate overlayer, wherein transition metal atoms selected from Group IV, Group V or Group VI of the Periodic Chart are covalently bonded to the surface oxygens of the substrate, and each transition metal atom is further covalently bonded to one or more of the organic ligands of the monolayer, thereby covalently bonding the organic monolayer to the substrate overlayer. Methods of forming the self-assembled organic ligand monolayers of the present invention are also disclosed.

U.S. Pat. No. 7,268,363 issued Sep. 11, 2007, to Lenhard et al., discloses photosensitive organic semiconductor compositions comprising an organic p-type semiconductor pigment with a p-type conducting polymer, wherein the ionization potentials of the organic p-type semiconductor pigment and the p-type conducting polymer are nominally equivalent and a photosensitive organic semiconductor composition comprising an organic n-type semiconductor pigment with an n-type conducting polymer, wherein the electron affinities of the organic semiconductor pigment and the conducting polymer are nominally equivalent. Also disclosed are a p/n heterojunction utilizing the photosensitive organic semiconductor compositions.

US Patent Application Publication No. 20080131709 published Jun. 5, 2008, to Hanson et al., discloses an article comprising: a substrate having a surface and comprising electrodeposited copper foil or copper alloy foil; an adherent layer serving to promote adhesion, comprising at least one organophosphonate or salt thereof covalently bound to the surface; and a functional layer, comprising at least one polymer bound to the adherent layer. The present invention further provides devices comprising a heat source or electronic component and the article described above, wherein the heat source is in thermal contact with the substrate and the electronic component is in electrical contact with the substrate. Also provided is a method of producing the above-described article.

U.S. Pat. No. 7,396,594 issued Jul. 8, 2008, to Schwartz et al., discloses carrier applied coating layers and a process for providing on the surface of a substrate an adherent phorphorous acid-based coating layer, the method comprising contacting said surface with a carrier conveying a coating composition comprising an acid selected from the group consisting of phosphoroic acids, organo-phosphoric acids, phosphonic acids, and mixtures thereof, at a sufficient temperature and for a sufficient time to bond at least a portion of the acid in the compositon to the oxide surface.

U.S. Pat. No. 7,471,503 issued Dec. 30, 2008, to Bruner et al., discloses solid electrolytic capacitors that comprise an organophosphorus material positioned between the dielectric layer and the polymeric electrolyte layer. The organophosphorus compound improves the interlayer adhesion between the dielectric and electrolyte layers.

US Patent Application Publication No. 20090246394 published Oct. 1, 2009, to Hanson et al., discloses a method for applying a hydrophobic coating to a surface of a display screen.

U.S. Pat. No. 7,625,149 issued Dec. 1, 2009, to Hanson et al., discloses a method and applicator for applying hydrophobic compositions to surfaces, wherein the applicator comprises an applicator tip fixed to a housing, and contained within the housing is a flowable hydrophobic composition of a metal silicon complex, and wherein the method includes applying the hydrophobic composition to a surface by rubbing the applicator tip across the surface.

U.S. Pat. No. 7,691,478 issued Apr. 6, 2010, to Avaltroni et al., discloses structures comprising substrates comprised of an organic material capable of accepting a proton from an organophosphorous compound and a film of the organophosphorous compound bonded to the substrate, which structures are useful in a variety of applications such as visual display devices.

U.S. Pat. No. 7,740,940 issued Jun. 22, 2010, to Hanson, discloses a coated article comprising a substrate having a plastic surface and adhered thereto an organometallic film in which the metal has f electron orbitals or is niobium, and also discloses methods for applying organometallic films to substrates and the organometallic films themselves.

U.S. Pat. No. 7,879,437 issued Feb. 1, 2011 to Hanson, discloses a non-particulate substrate having adhered thereto a coating composition comprising the reaction product of a transition metal compound such as niobium and a transition metal having electrons in the f orbital, and a silicon-containing material such as an organosilane or an organo (poly)siloxane, and discloses that reaction of the silicon-containing material with the transition metal compound results in a better adhering coating to the substrate than a comparable coating prepared from the silicon-containing material itself.

U.S. Pat. No. 7,879,456 issued Feb. 1, 2011, to Schwartz et al., discloses methods for bonding adherent phosphorous-containing coating layers to oxide surfaces on substrates wherein the substrates with oxide surfaces are selected from: (a) oxidized iron, titanium, silicon, tin and vanadium; (b) indium tin oxide; and (c) substrates with oxide layers deposited thereon, wherein the substrates on which oxide layers are deposited are selected from ceramics, semiconductors, metals, plastics and glass, and the method contacts the oxide surface with a carrier conveying an organophosphonic acid coating composition and heats the oxide surface and carrier at a sufficient temperature while maintaining contact for a sufficient time to bond a layer of the organophosphonic acid to the oxide surface. Coated articles prepared by the inventive method are also disclosed.

U.S. Pat. No. 7,901,777 issued Mar. 8, 2011, and U.S. Pat. No. 8,337,985 issued Dec. 25, 2012, both to Hanson, disclose a coated article comprising a substrate having a plastic surface and adhered thereto an organometallic film in which the metal has f electron orbitals or is niobium. Also disclosed are methods for applying organometallic films to substrates and the organometallic films themselves.

U.S. Pat. No. 7,989,069 issued Aug. 2, 2011, to Bruner et al., discloses an organometallic coating deposited from a metal alkoxide composition under conditions sufficient to form a polymeric metal oxide coating with unreacted alkoxide and hydroxyl groups. Also disclosed are substrates coated with the organometallic coating and a method for applying the organometallic coating to a substrate.

U.S. Pat. No. 8,025,974 issued Sep. 27, 2011, and U.S. Pat. No. 8,236,426 issued Aug. 7, 2012, both to Hanson et al., disclose inorganic substrates with a hydrophobic surface layer of a fluorinated material, wherein the fluorinated material can be directly adhered to the inorganic substrate or can be indirectly adhered to the inorganic substrate through an intermediate organometallic coating.

US Patent Application Publication No. 20110252884 published Oct. 20, 2011 to Hanscombe et al., discloses a vibrating cylinder transducer for measuring the pressure or density of a fluid medium comprising: a cylindrical vibrator, in use having at least one surface coupled to a fluid medium to be measured; a drive means for vibrating the cylindrical vibrator; a sensor for detecting the resonant frequency of the cylindrical vibrator; and an output coupled to the sensor, the output configured to provide an output signal indicative of the pressure and/or the density of the fluid medium; wherein the surface coupled to the fluid medium is coated in a corrosion resistant polymer layer. Preferably the corrosion resistant polymer layer is formed from parylene, with self-assembled monolayer phosphonate coatings also mentioned.

U.S. Pat. No. 8,048,487 issued Nov. 1, 2011, and U.S. Pat. No. 8,524,367 issued Sep. 3, 2013, both to Hanson, disclose organometallic coatings or films, substrates coated with such films and methods for applying the films to the substrates. The organometallic film or coating is derived from a transition metal compound containing both halide ligands and alkoxide ligands. Coated articles comprising polymer substrates and adhered to the substrate surface an organometallic film in which the metal comprises halide and alkoxide ligands are also disclosed.

U.S. Pat. No. 8,053,081 issued Nov. 8, 2011, to Petcavich et al., discloses a cutting tool having a cutting edge with a layer of an organophosphorus compound.

U.S. Pat. No. 8,067,103 issued Nov. 29, 2011, to Hanson, discloses optical articles such as ophthalmic lenses containing a thin hydrophobic surface layer of a fluorinated material adsorbed thereon.

US Patent Application Publication No. 20120003481 published Jan. 5, 2012, by Hanson, discloses organometallic coatings or films, substrates coated with such films and methods for applying the films to the substrates. The organometallic film or coating is derived from a transition metal compound containing both halide ligands and alkoxide ligands. Coated articles comprising polymer substrates and adhered to the substrate surface an organometallic film in which the metal comprises halide and alkoxide ligands are also disclosed.

US Patent Application Publication No. 20120104362, published May 3, 2012, by Hanson et al., discloses a method for altering an electronic property of a structure comprising an oxide surface or an oxide surface in electronic communication with the structure, the method comprises providing a covalently-bound film comprising at least one organic acid residue on a portion of the oxide surface so that at least one of the following properties of the structure is modified: (a) the charge carrier injection barrier properties; (b) the charge conductivity properties; (c) the charge transport properties; (d) the work function properties; (e) the sub-threshold slope; and (f) the threshold voltage.

U.S. Pat. No. 8,178,004 issued May 15, 2012, to Hanson, discloses a composition and method for forming a hydrophobic coating on a metallic substrate. The composition comprises: (a) a perfluorinated acid, (b) a surfactant, (c) an organic solvent, and (d) water. The composition is applied to the metal surface, the organic solvent and water permitted to evaporate and coalesce to form a substantially continuous film that preferably is in the form of a self-assembled monolayer covalently bonded to the surface of the substrate.

U.S. Pat. No. 8,432,036 issued Apr. 30, 2013, to Hanson et al., discloses a lead frame and an electronic package having improved adhesion between the lead frame and an encapsulating plastic material. The lead frame can be pre plated having an outer layer comprising a precious metal such as palladium or gold to which is adhered a self-assembled monolayer (SAM), such as a SAM derived from an organophosphorus acid. The organophosphorus acid preferably is a mixture in which the organo groups are fluoro substituted hydrocarbons and hydrocarbons containing ethylenically unsaturated groups.

U.S. Pat. No. 8,445,423 issued May 21, 2013, to Bruner et al., discloses wipes treated with organometallic compounds used in combination with organic acids in kit form, particularly organophosphorus acid. The kits can be used to treat various surfaces to alter the physical properties of the surfaces.

U.S. Pat. No. 8,558,117 issued Oct. 15, 2013, to Hanson, discloses an electroconductive ink made with metallic nanoparticles. The ink contains an organophosphorus acid that increases adhesion between the deposited metallic layer and the substrate to which the metallic layer is applied.

U.S. Pat. No. 8,658,258 issued Feb. 25, 2014, to Hanson, discloses an improved method for forming a self-assembled monolayer on a substrate, in which the method comprises plasma treatment of the substrate prior to formation of the self-assembled monolayer.

US Patent Application Publication No. 20140272149, published Sep. 18, 2014, by Hanson, discloses a process for forming a polymer film on a substrate through an intermediate organometallic layer. A self-assembled monolayer (SAM) containing an initiator for living polymerization such as controlled radical polymerization is formed on the organometallic layer followed by living polymerization such as controlled radical polymerization of a polymerizable monomer component.

US Patent Application Publication No. 20140272150 published Sep. 18, 2014, by Hanson, discloses a process for forming a fluorocarbon polymer film on a substrate. A self-assembled monolayer (SAM) containing an initiator for living polymerization such as controlled radical polymerization is formed on the surface of the substrate followed by living polymerization such as controlled radical polymerization of a polymerizable fluorocarbon monomer component.

US Patent Application Publication No. 20140272428 published Sep. 18, 2014, by Hanson, discloses a betaine-containing polymer film that can be formed on a substrate surface using living polymerization such as controlled radical polymerization.

US Patent Application Publication No. 20150083397 published Mar. 26, 2015, by Monroe et al., discloses that fouling caused by contaminants onto a metallic tubular, flow conduit or vessel in an underground reservoir or extending from or to an underground reservoir may be inhibited by applying onto the surface of the metallic tubular, flow conduit or vessel a treatment agent comprising a hydrophobic tail and an anchor. The anchor attaches the treatment agent onto the surface of the metallic tubular, flow conduit or vessel.

US Patent Application Publication No. 20150252656 published Sep. 10, 2015, by Hanson, discloses a method for recovering hydrocarbon material from a subterranean formation which includes introducing a treatment fluid into the subterranean formation. One treatment fluid includes at least one organometallic material having a metal or metalloid from Group III of the Periodic Table or a transition metal. An optional second fluid having an organophosphorous material can also be introduced. Another treatment fluid includes the reaction product of a transition metal compound and a silicon-containing material.

In spite of the above advancements in the coating art, none of the above patents or publications address the issue of wax and/or asphaltene depositions, nor operating in a crude oil environment.

Many of the conventional techniques like cutting, hot oiling, pigging are effective but they are manpower intensive and costly. The use of a coating to prevent the deposits from fouling surfaces is an improvement that reduces manpower and costs.

Most coatings swell and become soft when submerged in a liquid for extensive periods of time which is why marine coating are specially created to survive such environments. Crude oil service provides a wider chemical slate to contend with since it could have thousands of chemical species. Exposure to these chemicals can ruin surface properties that were created at the time of coating.

SUMMARY OF THE INVENTION

The AP (Anti-Paraffin) Coating composition of the present invention provides a unique and cost-effective way for petroleum facility owner/operators to address common paraffin/asphaltene deposition on cooperating stainless steel and nickel alloy sensor components and instrumentation. It is anticipated that the present method may be utilized with a wide range of metals as well as non-metallic components. In other embodiments, the anti-paraffin coatings of the present invention may be utilized on one or more surfaces of various equipment exposed to crude oil or hydrocarbon environments, including but not limited to, sucker rods, turbine meters, Coriolis meters, magnetic flow meters, down hole pumps, check valves, valves, cables, drill bits, wire lines, safety valves, floating head storage tank, and pigs, just to name a few.

Certainly, each piece of equipment may or may not have its own unique difficulty in operating in a crude oil environment. For example, with floating head storage where a floating head resides on top of the liquid and floats up/down with the variation in fluid height, wax and/or asphaltene may deposit/build up on the interior storage tank wall where the floating head impinges the wall. While this deposit/build up may in some cases cause problems with the movement of the floating head, the main problem is the periodic collapse of the deposit/build up off of the wall and onto the floating head, which can damage the floating head The present invention is a new application of a modified, existing, chemical technology representing a significant potential for reduction in typical labor and costs of paraffin/asphaltene remediation in critical process instrumentation and the elimination of associated hazards. Using available nano-coating materials applied to at least one surface of or cooperating surfaces of subject components produces permanent changes in the molecular characteristics of subject component metal, wetted parts and/or entire sensor assemblies, making them highly resistant to solids deposition in the extreme process environments normally encountered in petroleum production facilities. The present invention provides improved reliability of sensors and devices, as well as providing improved operational and maintenance personnel safety. Again, the key strategy is to avoid the initial affixation of the paraffin and asphaltene deposits on the surface subject components.

According to one embodiment of the present invention, there is provided a method for treating surfaces of equipment. The method may include applying a Self Assembled Monolayer of a moiety to at least one surface of the equipment, wherein the equipment is selected from the group consisting of sucker rods, turbine meters, Coriolis meters, magnetic flow meters, down hole pumps, check valves, valves, cables, drill bits, wire lines, and pigs, and wherein the moiety may be present in mono, di or tri headed form or as a bis, gem-bis or tris headed form, and is selected from the group consisting of phosphonates, thiols, amines, silanes, siloxanes, selenides, tellurides, isocyanides, or heterocycles. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

According to another embodiment of the present invention, there is provided equipment comprising at least one surface comprising a Self Assembled Monolayer of a moiety, wherein the moiety may be present in mono, di or tri headed or as a bis, gem-bis or tris headed form, and is selected from the group consisting of phosphonates, thiols, amines, silanes, siloxanes, selenides, tellurides, isocyanides, or heterocycles, and wherein the equipment is selected from the group consisting of sucker rods, turbine meters, Coriolis meters, magnetic flow meters, down hole pumps, check valves, valves, cables, drill bits, wire lines, and pigs. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

According to even another embodiment of the present invention, there is provided a method for handling precipitating solids comprising at least one selected from the group consisting of paraffin and asphaltene. The method may include precipitating the solid, and contacting a surface with the solid, wherein the surface comprises a Self Assembled Monolayer of a moiety, wherein the moiety may be present in mono, di or tri headed or as a bis, gem-bis or tris headed, and is selected from the group consisting of phosphonates, thiols, amines, silanes, siloxanes, selenides, tellurides, isocyanides, or heterocycles. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

According to yet another embodiment of the present invention, there is provided a method for installing a device into a crude oil service operation. The method may include installing the device into a section of the crude oil service operation, wherein the device comprises a surface comprising a Self Assembled Monolayer of a moiety, wherein the moiety may be present in mono, di or tri headed or as a bis, gem-bis or tris headed form, and is selected from the group consisting of phosphonates, thiols, amines, silanes, siloxanes, selenides, tellurides, isocyanides, or heterocycles. The method may also include contacting the surface with the contaminant, wherein the contaminant is selected from the group consisting of paraffins and asphaltenes. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

According to even still another embodiment of the present invention, there is provided a system that may include a liquid environment that comprises at least one contaminant selected from the group consisting of paraffins and asphaltene, and may also include a surface residing within the environment comprising a Self Assembled Monolayer of a moiety, wherein the moiety may be present in mono, di or tri headed or as a bis, gem-bis or tris headed form, and is selected from the group consisting of phosphonates, thiols, amines, silanes, siloxanes, selenides, tellurides, isocyanides, or heterocycles. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

According to even yet another embodiment of the present invention, there is provided a system that may include a conduit having an internal surface comprising a Self Assembled Monolayer of a moiety, wherein the moiety may be present in mono, di or tri headed or as a bis, gem-bis or tris headed form, and is selected from the group consisting of phosphonates, thiols, amines, silanes, siloxanes, selenides, tellurides, isocyanides, or heterocycles, wherein the conduit is selected from the group consisting of a pipeline, line, and tubing, and may also include hydrocarbon liquids present in the conduit. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

According to still even another embodiment of the present invention, there is provided a system that may include a vessel having an internal surface comprising a Self Assembled Monolayer of a moiety, wherein the moiety may be present in mono, di or tri headed or as a bis, gem-bis or tris headed form, and is selected from the group consisting of phosphonates, thiols, amines, silanes, siloxanes, selenides, tellurides, isocyanides, or heterocycles, and may also include hydrocarbon liquids present in the vessel. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

According to still yet another embodiment of the present invention, there is provided a system that may include a conduit having an exterior surface comprising a Self Assembled Monolayer of a moiety, wherein the moiety may be present in mono, di or tri headed or as a bis, gem-bis or tris headed form, and is selected from the group consisting of phosphonates, thiols, amines, silanes, siloxanes, selenides, tellurides, isocyanides, or heterocycles, wherein the conduit is selected from the group consisting of a pipeline, line, and tubing, and may also include hydrocarbon liquids present in the conduit. In further non-limiting embodiments, the moiety may be present in mono, di or tri headed form or as a bis, gem-bis or tris headed form, and is selected from the group consisting of thiols, amines, silanes, siloxanes, selenides, tellurides, isocyanides, or heterocycles. In even further non-limiting embodiments, the moiety may be present in di or tri headed form or as a bis, gem-bis or tris headed form, and is phosphonate.

BRIEF DESCRIPTION OF THE FIGURES

FIGS. 4A-4C illustrate capacitance sensors having cylindrical outer housings.

FIGS. 4D-4E show an alternative embodiment of a capacitance sensor having a generally rectangular outer housing.

FIG. 4F is a perspective view of the embodiment of FIGS. 4D and 4E.

DETAILED DESCRIPTION OF A PREFERRED EMBODIMENT

The present invention to create resistance to and/or reduce paraffin/asphaltene deposition on stainless steel and nickel alloy components utilizes a composition known as a Self-Assembled Monolayer of Phosphonate (SAMP). SAMP is commercially available from a wide range of suppliers. Typically, SAMP is utilized with an alcohol-based carrier which allows for rapid drying. It is anticipated that the SAMP may be combined with a glycol carrier for use in the treatment of components used in crude oil service operation.

A monolayer is a nanoscale coating that is one molecule thick or any of the following thicknesses, or in a range of to/from or between and of the following thicknesses of 1, 2, 3, 4, 5, 6, 7, 8, 9 or 10 nanometers (1 nm=1×10−9 meters). A phosphonate is a phosphorous acid connected with a carbon-based group through a highly stable phosphorus carbon bond.

The phosphonic acid reacts with the component surface through stable metal phosphorus bonds, and the carbons are chosen for their non-stick chemical functionality. The SAMP is covalently bound to the substrate, forming a durable, low-surface tension, non-stick surface. This permanent chemical bond is highly stable under ambient conditions. Currently, an alcohol-based carrier is combined with the SAMP in some applications, but using a glycol-based carrier is unique in crude oil environments.

Through standard Dyne pen testing, surface energy is shown to be significantly and permanently reduced through application of a nano-coating to the tested component. Field trials with components treated via the present inventive process indicate a significant reduction of paraffin/asphaltene deposition on stainless steel sensor components installed in crude oil storage tanks operated in low acidity/low turbulence applications at normal temperatures.

Figure 1:
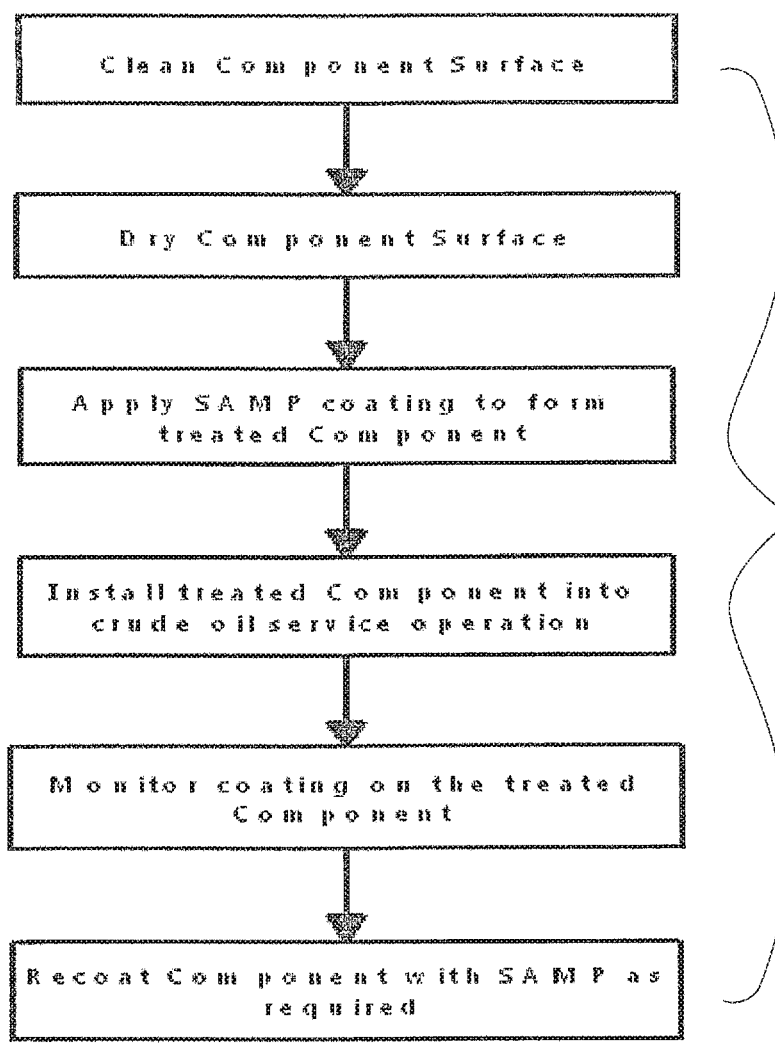
FIG. 1 illustrates a diagram of the present invention method showing the process steps.

The present inventive process may be utilized in the manufacture of sensors and instrumentation for a crude oil service operation. As a non-limiting embodiment, a typical application method during manufacture involves a simple two-part process in which a cleaner/primer wipe is manually applied to prepare the surface of the stainless steel or nickel alloy components and rinsed with de-ionized water to remove dirt, grease, etc. After the initial cleaning/preparation step and drying, a nano-coating wipe is manually applied directly to the component to be protected. The method is simple: clean, dry, apply, insert, and monitor process, as illustrated in FIG. 1.

Figure 3:
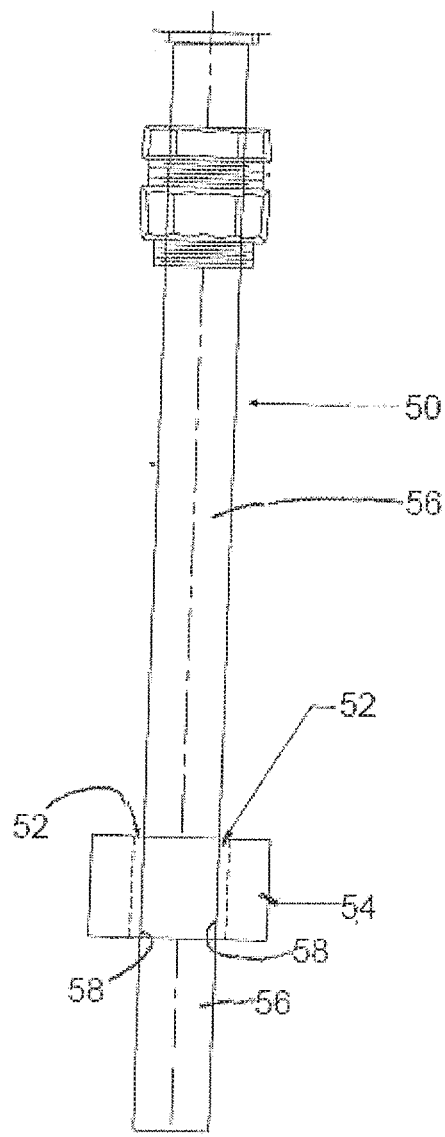
FIG. 3 is a basic illustration of some components of a digital level sensor described in this application.

As an example, the manufacture of a vertical crude oil storage tank level sensor includes a continuous 316L, square, stainless steel outer tubing that cooperates with the float carrier and all electronic sensor components and switches that are activated by the movement of the float carrier to measure the level of the liquid in the storage tank. FIG. 3 shows the square tubing 50 of a digital level sensor (DLS), a float carrier 52 with floats members 54 attached to the carrier 52. During operation, the outer surface 56 of tubing comes into contact with the inner surface 58 of the carrier 52. This sliding contact between the tubing 50 and the inner surface 58 of the float carrier 52 is adversely affected if paraffin or asphaltene deposits build up on these surfaces. When deposits build up on the surfaces of the components, the float carrier 52 does not freely move up and down the tubing 50, thereby causing false level readings in the digital level sensor. The outer tubing extends the entire length of the sensor from top tank connection to the bottom of the sensor. After assembly and testing, the sensor is disassembled and the nano-treatment is completed in the following steps:

a. The sensor assembly including the stainless steel tubes 50, float carrier 52, and floats 54 are placed on horizontal support racks. The entire sensor assembly is thoroughly cleaned on all sides with an alcohol or phosphate-based detergent laden sponge or wipe 60 to remove any mill oil, dirt, grease, etc. and liberally flushed with clean water. This process step is repeated until all visual indications of surface contaminants are removed.

b. The assembly is thoroughly dried using clean, lint-free cloth or absorbent paper towels.

c. Immediately after drying, the nano-treatment chemical composition of the present invention (SAMP) is directly applied to the clean outer tube surfaces 56 and the inner carrier surfaces 58 of the assembly parts with a soft cloth or wipe 62 impregnated with the SAMP composition and gently rubbed into the outer surface 56 and inner surface 58 in order to assure complete chemical coverage. After approximately 1 minute of contact time, excess SAMP composition residue is removed and the complete assembly is thoroughly dried and reassembled.

Figure 4A:
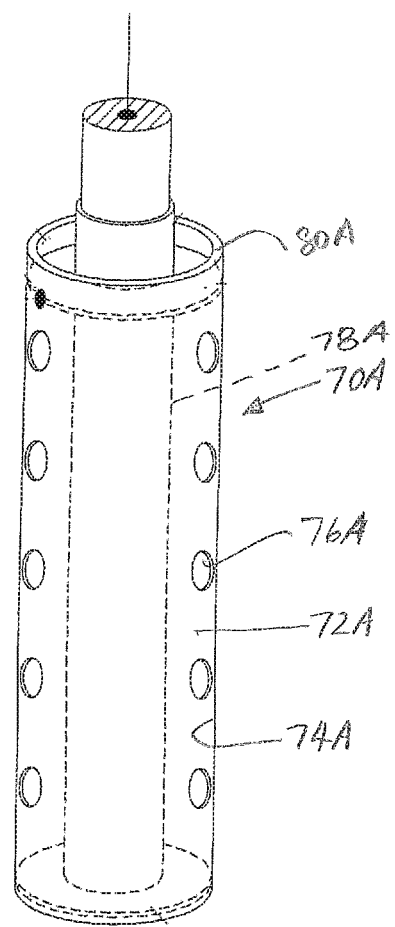
FIGS. 4A-4F are illustrations of capacitance sensors which have been treated along exposed surfaces with the anti-paraffin coating composition of the present invention.
Figure 4B:
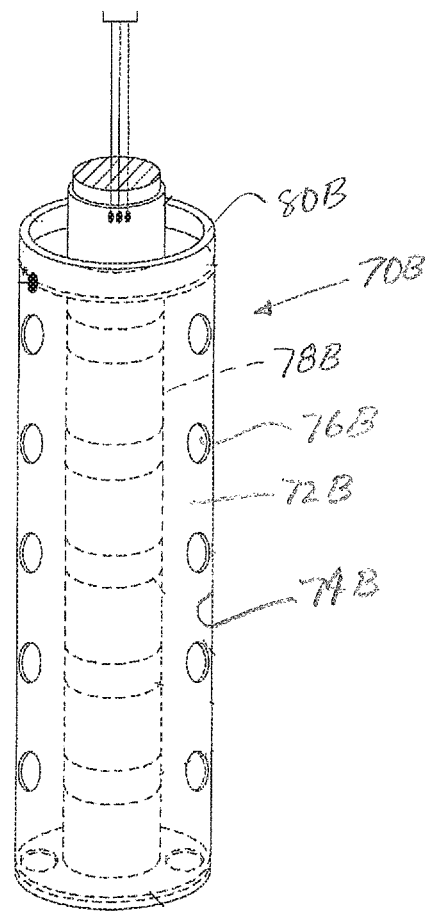
Figure 4C:
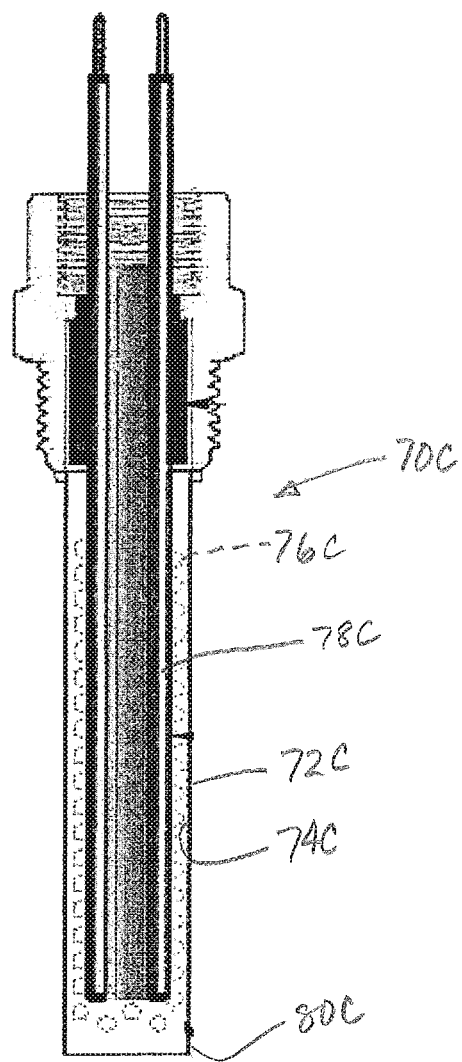
Figure 4F:
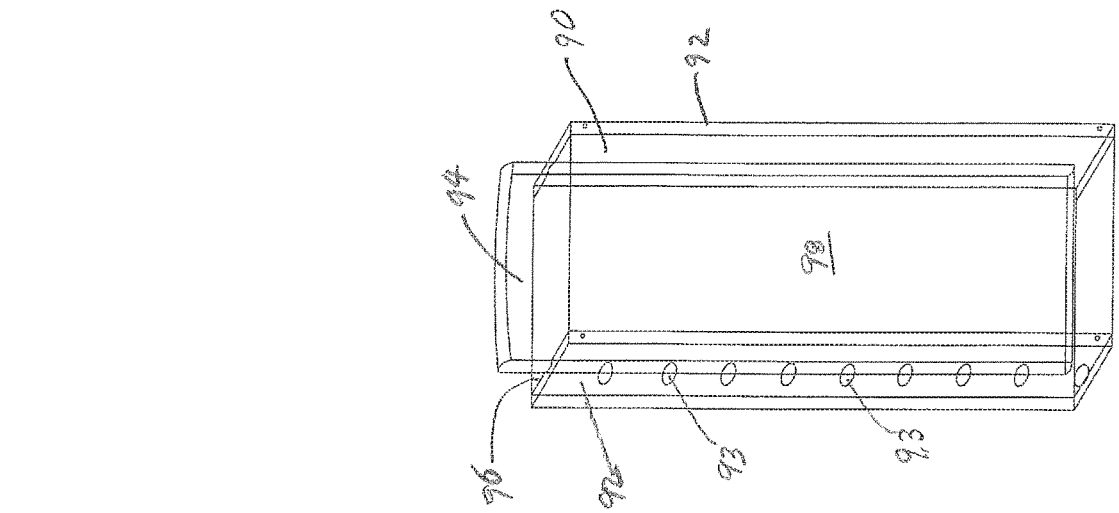
Figure 4E:
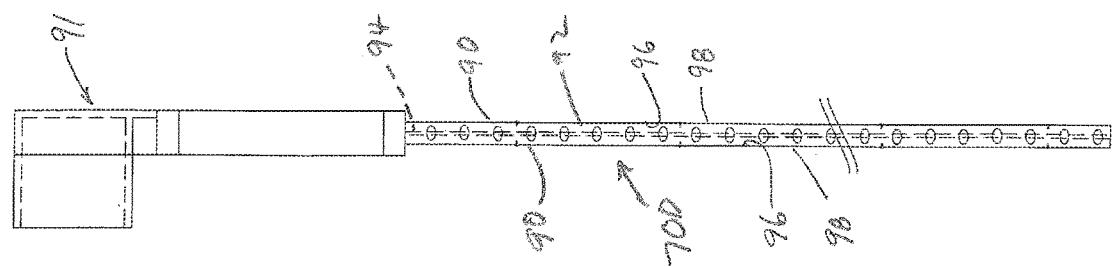
Figure 4D:
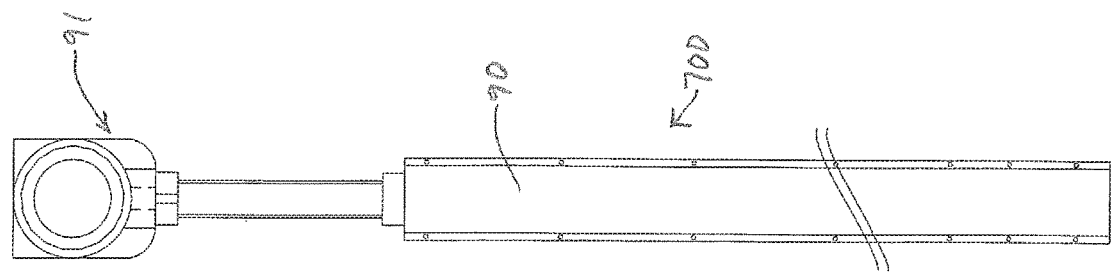

According to the present inventive method, capacitance sensors 70A, 70B, 70C and 70D as shown in FIGS. 4A-4F may be treated as described above. The nano-treatment chemical composition (SAMP) is directly applied to the clean outer surfaces 72A, 72B, 72C, 72D; the inner surfaces 74A-74D; and core elements 78A-78D as described above. It may be further understood that openings 76A, 76B, and 76C in FIGS. 4A-4C allow crude oil to flow through the sensors, 70A-70C and become exposed to the sensor core 78A-78C. In FIGS. 4D-4F, capacitance sensor 70D has a different, unique design wherein rather from utilizing a generally, cylindrical tube 80A-80C, as shown in FIGS. 4A-4C, two spaced-apart stainless steel plates 90 are held in a generally parallel relationship by two, perforated plastic sidewalls 92. A shrink wrapped printed circuit board sensor 94, with an explosion-proof head 91 attached to one end of the sensor, is disposed within the generally rectangular enclosure or housing formed by the two steel plates 90 and the perforated plastic side walls 92.

The nano-treatment chemical composition (SAMP) is applied to the inner surfaces 96 and outer surfaces 98 of the spaced-apart stainless steel plates 90. Crude oil flows through the perforation 93 in the sidewall 92 to be read by the sensor printed circuit board 94.

Excess SAMP composition residue is removed from the treated surfaces. With the sensors 70A, 70B, 70C and 70D, it is the utilization of the anti-paraffin composition along the surfaces exposed to the crude oil which reduces the paraffin build-up which may affect the sensitivity of the sensor.

In future applications involving larger scale factory coating processes, the manual system described above can easily be replaced with more automated processes, non-limiting examples of which include spray-type applicators and/or a tank dip system. A commercial embodiment of the present invention may comprise bulk supply and large scale application of primer/cleaner, coating chemical, and rinse/flush agents. The coatings of the present invention may be designed for coating a wider range of metal as well as non-metal surfaces (including glass, polymers, etc.).

Figure 2:
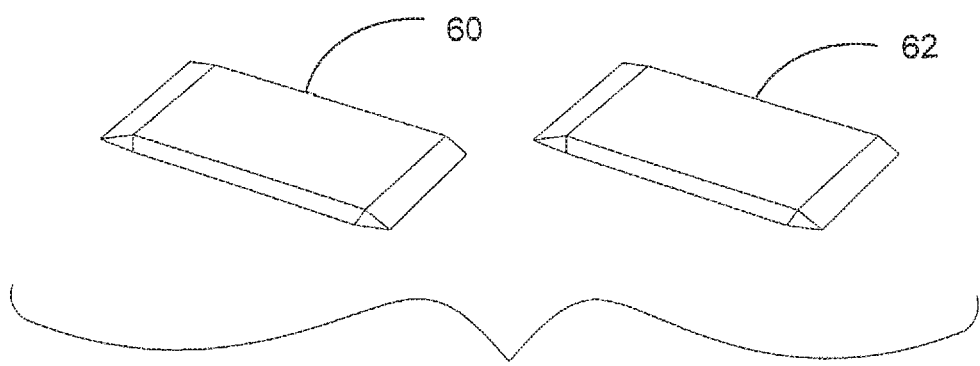
FIG. 2 is the perspective view of a foil packet of the present inventive kit.

In another non-limiting embodiment, a kit may be employed wherein individual wipes 60 and 62 (FIG. 2) are separately sealed and robustly packaged to withstand long-term storage and handling. Wipe 60 is a cleaning wipe having an alcohol or phosphate-based detergent. Wipe 62 is impregnated with a SAMP composition appropriate for the application. The chemical components are non-toxic, REACH compliant (having approximately the same environmental characteristics as common isopropyl alcohol), and have no known adverse environmental impacts. No specialized training or Personal Protective Equipment (PPE) is required for use.

A proper application of the nano-coating composition produces a permanent molecular bond that is highly stable under normal ambient conditions. However, components subjected to turbulent flow profiles in which basic sediment index is high (abrasive service), or those subject to high acidity/temperature may require a re-application of the protective coating due to surface abrasion of the metal component.

It should be understood that the AP coating is monitored to evaluate the effectiveness of the SAMP composition coating. Recoating of components may be accomplished by cleaning, drying, and applying, as described above.

It should be understood that the SAMP composition of the present invention may be enhanced by the addition of tracer additives which impart a "tint" or color to treated components. Such "tinting" will result in an observable indication of the sufficiency of the component coating. As the "tint" intensity decreases, the operator will be able to determine if additional coating coverage is required. Further, enhancements may include additives to produce a wider range of component surface characterizations including, but not limited to, corrosion inhibitors, anti-static properties, and the like. As described above, utilization of a glycol-based carrier component to the SAMP composition may enhance crude oil process/service applications.

While much of the above description has focused on SAMP, that is, a Self-Assembled Monolayer of Phosphonate, as the coating/composition, other non-limiting embodiments of the present invention include utilizing other types of SAMs.

The building block of self-assembled monolayers (SAMs) is generally considered to be a molecule that bonds to a surface through a head group or linker that has an affinity for the surface. The molecule typically also has a spacer group and an end-group or tail. In addition to phosphonate, SAM's may also be formed from other moieties, including but not limited to thiols, amines, silanes, siloxanes, selenides, tellurides, isocyanides, or heterocycles.

Thiols form strong bonds directly with metal surfaces and are stable over a wide range of temperatures, solvents, and potentials. They are well suited to treat noble metals due to the ability to form strong bonds with metal.

Carboxylic acids can also be used to bond directly with metals and show good affinity for copper, palladium, and platinum. Carboxylic acids are also adept at displacing surface organics that could otherwise interfere with good surface treatment.

Amines are often used as terminal end for SAMs to behave as a coupling agent to another layer. However, as a head group it could be useful to bond to substrates comprised of carbonates or sulfides.

Silanes and siloxanes can be used to bond to ceramics, glass, carbon fibers, masonry, and some polymeric materials. Trichlorosilane for example reacts with hydroxyl groups on a substrate and forms a stable covalent bond.

Selenide provides similar chemistry as sulfide with an oxidation number of −2 allowing them to bond to metal. Selenide could be particularly useful for semiconductor applications particularly those made from gallium arsenide.

Tellurides are similar in chemistry to sulfides and selenides and also bond well to metals. Tellurides are found in natural gold deposits like calaverite, kernnerite, and sylvanite.

Isocyannide or carbylamine can attach to metals like gold and lead in oxygen free environments but are unstable to exposure to ambient conditions.

Heterocyles with one or two hetero atoms taken from the group of oxygen, nitrogen, sulfur, phosphorous, silicon, or arsenic most typically in 5 or six membered rings can form bonds with substrates. 3-membered rings are too reactive to remain heterocycle but could be used to react to certain substrates like urethanes or epoxies. Pyrrolidine, imidazonline, pyridines, thiazines, diazines are a few example of heterocycles that may be used as a head group.

In some cases it may be desirable to form SAM with more than one head group to obtain better surface coverage or durability through multiple bonds than with one head group alone. Any of the above described SAM's could be mono, di or tri headed or as a bis, gem-bis or tris headed compound. Multiple head groups could be connected through a single atom or each could have its own spacer.

Regarding the bis, tris and gem-bis compounds and nomenclature as utilized herein, for simple substituents (not themselves substituted) di- and tri-multiplying prefixes are used. The bis- and tris-multiplying prefix are used when the substituents are themselves substituted (or the ligand already has a di or tri in the compound name). Thus, as a non-limiting example, the term of "gem-'bis-something' group" is meant to refer to groups including two 'something' groups bound to a same carbon atom, and these groups therefore have a something-C-something bond. Same understanding is to be applied to "gem-tris-something group". As a non-limiting example, "gem-bisphosphonate" is meant to refer to groups including two phosphonate groups bound to a same carbon atom. These groups therefore have a P—C—P bond.

Non-limiting examples of suitable bis compounds include: 1,2-bis(12-Dodecylphosphonic acid)disulfane; 2-bis(12-Diethyldodecylphosphonate)disulfane; adipolybisphosphonic acid; (6-Phosphonohexyl) phosphonic acid; 1,6-Hexanebisphosphonic acid; (5,5,6,6,7,7,8,8,9,9,10,10,11,11,11-pentadecafluoro-1-pho sphonoundecan-3-yl) phosphonic acid. Other suitable examples of compounds useful in the present invention may be found in US20140000476 (bis-phosphonic compounds), EP2054165A2 (gem bisphosphonic compounds), US20050153938 (polyphosphonate compounds), US20080220037 (biphosphonic compounds), US20130287955 (perfluorinated bisphosphonic compounds), and US20150103639 (phosphonic compounds), WO2015177229A3, and WO2015177229.

The SAM's of the present invention find utility in coating all or part of the surfaces of equipment, such as but not limited to, level sensors, sucker rods, turbine meters, Coriolis meters, magnetic flow meters, down hole pumps, check valves, valves, cables, drill bits, wire lines, and pigs, just to name a few. The present invention is useful for surfaces that come into contact with hydrocarbon liquids, including both crude oils and condensates, in which paraffins and/or asphaltenes are present or may become present and may deposit on any surface of such equipment.

As a non-limiting example, the present invention may find utility when utilized with sucker rods. In the production of oil and gas, a sucker rod is a rod, typically made of steel and between 25 and 30 feet (7 to 9 meters) in length, and threaded at both ends, used to join together the surface and downhole components of a reciprocating piston pump installed in an oil well. The pump jack is the visible above-ground drive for the well pump, and is connected to the downhole pump at the bottom of the well by a series of interconnected sucker rods that extending through the cased or uncased wellbore. One problem encountered by sucker rods is the buildup of paraffin/asphaltenes on the surface of the sucker rod during operation in oil and gas wells. The buildup may occur to such to extent that the rod string can break under the added weight of the combined rod string and wax. In further method embodiments the present invention may be applied to one or more surfaces of the sucker rod to slow down, discourage or even prevent such buildup, resulting in further apparatus and products of the present invention.

The present invention will also have utility with a wide variety of flow meters in which it is important to slow down and/or prevent buildup of paraffin/wax on any surface of the meter to maintain the integrity of the meter. The present invention is believed to be useful on the surfaces of at least the following flow meters: mechanical flow meters such as piston meter/rotary piston (for example, oval gear meter), gear meter (for example helical gear nutating disk meter), variable area meter, turbine flow meter, Woltman meter, single jet meter, paddle wheel meter, multiple jet meter, Pelton wheel and current meter; pressure-based meters such as venturi meter, orifice plate, Dall tube, pitot-tube, multi-hole pressure probe, cone meters and linear resistance meters; optical flow meters; open-channel flow measurement meters such as level to flow, area/velocity, dye testing and acoustic doppler velocimetry; thermal mass flow meters such as the MAF sensor; Vortex flow meters; electromagnetic, ultrasonic and coriolis flow meters such as magnetic flow meters, non-contact electromagnetic flow meters, ultrasonic flow meters (Doppler, transit time), and coriolis flow meters; and laser Doppler flow measurement meters.

As another non-limiting example, the present invention may also have utility with turbine meters. In general, a turbine flow meter (better described as an axial turbine) translates the mechanical action of the turbine rotating in the liquid flow around an axis into a user-readable rate of flow (gpm, lpm, etc.). The turbine tends to have all the flow traveling around it. The turbine wheel is set in the path of a fluid stream. The flowing fluid impinges on the turbine blades, imparting a force to the blade surface and setting the rotor in motion. When a steady rotation speed has been reached, the speed is proportional to fluid velocity. Optionally, there may be positioned upstream and/or downstream of the turbine wheel one or more fluid stabilizers to help stabilize the fluid flow prior to contact with the turbine meter and/or as the fluid flows away from the turbine meter. Turbine meters are carefully machined to straighten the flow of fluids and pass them through a turbine to measure the flow through the meter. When operating in an oil and gas environment, especially where paraffin/asphaltene are an issue, the surfaces of the stabilizers, turbine wheel and/or even tube in which they are positioned may become coated with such paraffin/asphaltene buildup. When these surface become irregular due to such buildup they then cease to function properly and give erroneous results. In extreme cases deposition on the straitening vanes, turbine blades or housing may lead to plugging of the meter. Thus, in further method embodiments the present invention may be applied to one or more surfaces of the turbine meter, including to one or more surfaces of the stabilizers, turbine wheel and/or even tube in which they are positioned, to slow down, discourage or even prevent such buildup, resulting in further apparatus and products of the present invention.

Coriolis meters (also known as inertial or mass flow meters) are well known devices that measure mass flow rate of a fluid traveling through a tube. The mass flow rate is the mass of the fluid traveling past a fixed point per unit time. Coriolis meters generally comprise a set of parallel tubes in rotation or vibration, and an actuator which induces a vibration of the tubes. When the fluid to be measured is flowing, it is led through two parallel tubes that are designed to be counter-vibrating. The actual frequency of the vibration depends on the size of the mass flow meter, and commonly ranges from 80 to 1000 vibrations per second. When no fluid is flowing, the vibration of the two tubes is symmetrical. However, when there is mass flow, there is some twisting of the tubes. In those portions of the tube through which fluid flows away from the axis of rotation it must exert a force on the fluid to increase its angular momentum, so it is lagging behind the overall vibration. In other portions of the tube through which fluid is pushed back towards the axis of rotation it must exert a force on the fluid to decrease the fluid's angular momentum again, hence that arm leads the overall vibration. The inlet tube and the outlet tube vibrate with the same frequency as the overall vibration, but when there is mass flow the two vibrations are out of sync: the inlet arm is behind, the outlet arm is ahead. The two vibrations are shifted in phase with respect to each other, and the degree of phase-shift is a measure for the amount of mass that is flowing through the tubes. As might be guessed, flow of fluid though these tubes is quite sensitive to any paraffin/asphaltene buildup which might occur, especially when the fluid is a crude oil. Specifically, paraffin and asphaltene buildup on the surfaces of measurement tubes will cause a change in the cross sectional area of the tube at the point of buildup, and will cause a change in the mass of the tube at the point of buildup, either of which will have a detrimental effect on any resulting measurement. Thus, in further method embodiments the present invention may be applied to one or more surfaces of the Coriolis meter in contact with the flowing fluid (i.e., the interior surfaces of the tubes), to slow down, discourage or even prevent such buildup, resulting in further apparatus and products of the present invention.

Magnetic flow meters, often called "mag meter"s or "electromag"s, use a magnetic field applied to the metering tube, which results in a potential difference proportional to the flow velocity perpendicular to the flux lines. The potential difference is sensed by electrodes aligned perpendicular to the flow and the applied magnetic field. The physical principle at work is Faraday's law of electromagnetic induction. The magnetic flow meter requires a conducting fluid and a nonconducting pipe liner. The electrodes must not corrode in contact with the process fluid; some magnetic flowmeters have auxiliary transducers installed to clean the electrodes in place. The applied magnetic field is pulsed, which allows the flowmeter to cancel out the effect of stray voltage in the piping system. Because the magnetic flow meters measure the electromagnetic flux across the whole diameter of the measuring tube they can be subject to asphaltene and asphaltene deposits that reduce the diameter and interfere with the proper operation of the meter. Thus, in further method embodiments the present invention may be applied to one or more surfaces of the magnetic flow meter in contact with the flowing fluid (i.e., the electrode and/or the interior of the flow tube), to slow down, discourage or even prevent such buildup, resulting in further apparatus and products of the present invention.

Downhole pumps, both reciprocating as well as rotational both suffer from wax and asphaltene deposition. On reciprocating pumps the ball and seat assemblies can be fouled preventing a good seal and disrupting pump operation. Rotating pumps rely on spinning stages to increase pressure and small changes in the stage shape can cause flow to be disrupted and efficiency to drop to a point the pump must be pulled and replaced. Thus, in further method embodiments the present invention may be applied to one or more surfaces of downhole pumps in contact with the pumped fluid to slow down, discourage or even prevent such buildup, resulting in further apparatus and products of the present invention.

Check valves are used to control fluid by sealing at a specified pressure and only allowing flow when the pressure on the other side of the value exceeds the sealing pressure. The sealing pressure could come from well fluids, a spring, a control line, or other source of force. Check valves are often used as safety devices to allow flow to be relieved if a critical pressure is reached or to only allow flow if pressure is applied. In either case deposition on the internal components of the valve can either cause the valve to fail to open or fail to close which could shut in production or create a potentially hazardous situation due to over pressurizing a line or vessel. Thus, in further method embodiments the present invention may be applied to one or more surfaces of check valves in contact with fluid to slow down, discourage or even prevent such buildup, resulting in further apparatus and products of the present invention.

Valves are used to control flow both for simple on and off control as well as to regulate flow rate. When the sealing surfaces are fouled with deposits they no longer can function as designed. When valves can no longer properly control flow a variety of problems such as leaks, spills, fires, gas releases, or other hazards can occur. Thus, in further method embodiments the present invention may be applied to one or more surfaces of valves in contact with fluid to slow down, discourage or even prevent such buildup, resulting in further apparatus and products of the present invention.

Cables are used to supply power to downhole equipment. Deposits can form on the outside of the cables. Weight can become a problem with unsupported cables which could lead to breakage. For cables that are strapped to pipe the deposition interferes with the strapping used to keep the cable attached to the pipe. This slows the process of removing the equipment from the well. Thus, in further method embodiments the present invention may be applied to one or more surfaces of cables in contact with fluid to slow down, discourage or even prevent such buildup, resulting in further apparatus and products of the present invention.

Wirelines are used to clean wells, set tools, log wells, fish for broken tools or equipment and many other functions. Wirelines can pick up deposits that impede their ability to feed through guides, increase weight, foul centralizers, skates and other critical equipment needed for proper operation. Thus, in further method embodiments the present invention may be applied to one or more surfaces of wirelines in contact with fluid to slow down, discourage or even prevent such buildup, resulting in further apparatus and products of the present invention.

Non-limiting examples of commercial applicability of the present invention include petroleum production, petroleum pipelines, petroleum equipment (storage tanks and specialty vessels, etc.), and petroleum sensor and instrument manufacturing.

The foregoing is considered as illustrative only of the principles of the invention. Further, since numerous modifications and changes will readily occur to those skilled in the art, it is not desired to limit the invention to the exact construction and operation shown and described.

Those skilled in the art will recognize other embodiments of the invention which may be drawn from the illustrations and the teachings herein. To the extent that such alternative embodiments are so drawn, it is intended that they shall fall within the ambit of protection of the claims appended hereto.

Having disclosed the invention in the foregoing specification and accompanying drawings in such a clear and concise manner, those skilled in the art will readily understand and easily practice the invention.

What is claimed is:

1. A system comprising
    a liquid environment that comprises at least one contaminant selected from the group consisting of paraffins and asphaltene; and,
    a surface residing within the environment comprising a Self Assembled Monolayer of a moiety, wherein the moiety comprises a di or tri headed or as a bis, gem-bis or tris headed form, and is phosphonate;
    wherein the monolayer resists deposition of paraffins or asphaltenes on the surface residing within the environment.

2. The system of claim 1, wherein the surface is a wetted part.

3. The system of claim 1, wherein the liquid environment further comprises a hydrocarbon liquid.

4. The system of claim 1, wherein the liquid environment further comprises a crude oil.

5. The system of claim 1, wherein the surface forms a part of an equipment.

6. The system of claim 5, wherein the equipment is selected from the group consisting of sucker rods, turbine meters, Coriolis meters, magnetic flow meters, down hole pumps, check valves, cables, drill bits, wire lines, and pigs.

7. The system of claim 1, wherein the surface forms a part of a conduit.

8. The system of claim 7 wherein the conduit is selected from the group consisting of pipeline, line, piping and tubing.

9. A system comprising
a hydrocarbon environment; and,
a surface residing within the environment comprising a Self Assembled Monolayer of a moiety, wherein the moiety comprises a di or tri headed or as a bis, gem-bis or tris headed form, and is phosphonate;
wherein the monolayer is anti-paraffin.

10. The system of claim 9, wherein the surface is a wetted part.

11. The system of claim 9, wherein the hydrocarbon comprises crude oil.

12. The system of claim 9, wherein the surface forms a part of an equipment.

13. The system of claim 12, wherein the equipment is selected from the group consisting of sucker rods, turbine meters, Coriolis meters, magnetic flow meters, down hole pumps, check valves, cables, drill bits, wire lines, and pigs.

14. The system of claim 9, wherein the surface forms a part of a conduit.

15. The system of claim 14 wherein the conduit is selected from the group consisting of pipeline, line, piping and tubing.

16. A system comprising
a hydrocarbon environment; and,
a surface residing within the environment comprising a Self Assembled Monolayer of a moiety, wherein the moiety comprises a di or tri headed or as a bis, gem-bis or tris headed form, and is phosphonate;
wherein the monolayer is resistant to an initial affixation of paraffin or asphaltene on the surface.

17. The system of claim 16, wherein the surface is a wetted part.

18. The system of claim 16, wherein the liquid environment further comprises a hydrocarbon liquid.

19. The system of claim 16, wherein the liquid environment further comprises a crude oil.

20. The system of claim 16, wherein the surface forms a part of an equipment.

21. The system of claim 20, wherein the equipment is selected from the group consisting of sucker rods, turbine meters, Coriolis meters, magnetic flow meters, down hole pumps, check valves, cables, drill bits, wire lines, and pigs.

22. The system of claim 16, wherein the surface forms a part of a conduit.

23. The system of claim 22 wherein the conduit is selected from the group consisting of pipeline, line, piping and tubing.

* * * * *